US012348791B2

(12) United States Patent
Zeng

(10) Patent No.: US 12,348,791 B2
(45) Date of Patent: Jul. 1, 2025

(54) METHOD AND APPARATUS FOR PLAYING LIVESTREAMING VIDEO, ELECTRONIC DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventor: Fangguo Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 72 days.

(21) Appl. No.: 18/299,047

(22) Filed: Apr. 12, 2023

(65) Prior Publication Data

US 2023/0247234 A1 Aug. 3, 2023

Related U.S. Application Data

(63) Continuation of application No. PCT/CN2022/095455, filed on May 27, 2022.

(30) Foreign Application Priority Data

Jul. 14, 2021 (CN) .......................... 202110797382.5

(51) Int. Cl.
*H04N 21/2187* (2011.01)
*H04N 21/2183* (2011.01)
*H04N 21/472* (2011.01)

(52) U.S. Cl.
CPC ..... *H04N 21/2187* (2013.01); *H04N 21/2183* (2013.01); *H04N 21/47217* (2013.01)

(58) Field of Classification Search
CPC ........... H04N 21/2187; H04N 21/2183; H04N 21/47217
See application file for complete search history.

(56) References Cited

U.S. PATENT DOCUMENTS

| 9,264,472 B2* | 2/2016 | Costanzo | ......... H04N 21/44016 |
| 2006/0048184 A1* | 3/2006 | Poslinski | ........... H04N 21/4542 348/E5.112 |

(Continued)

FOREIGN PATENT DOCUMENTS

| CN | 109618179 A | 4/2019 |
| CN | 111294634 A | 6/2020 |

(Continued)

OTHER PUBLICATIONS

The World Intellectual Property Organization (WIPO) International Search Report for PCT/CN2022/095455 Jul. 22, 2022 12 Pages (including translation).

*Primary Examiner* — Joshua D Taylor
(74) *Attorney, Agent, or Firm* — ANOVA LAW GROUP PLLC

(57) ABSTRACT

A livestreaming video playing method executed by a computer device includes displaying an information flow page including at least one livestreaming video. A video data block of each of the at least one livestreaming video is updated periodically in the information flow page at an update period. The method further includes playing a target video data block of a first livestreaming video of the at least one livestreaming video in response to a playing instruction for the first livestreaming video, obtaining target cache data of the first livestreaming video that belong to historical livestreaming data of the first livestreaming video at a target duration that is before a current livestreaming time point and greater than or equal to the update period, and playing the target cache data after the target video data block ends playing.

20 Claims, 9 Drawing Sheets

(56) References Cited

U.S. PATENT DOCUMENTS

2017/0177174 A1* 6/2017 Ko ..................... H04N 21/4314
2020/0314384 A1* 10/2020 Deschenes ........... G11B 27/005
2020/0366725 A1* 11/2020 Skog ..................... H04L 67/568

FOREIGN PATENT DOCUMENTS

| CN | 111726641 A | 9/2020 |
| CN | 111726657 A | 9/2020 |
| CN | 112822503 A | 5/2021 |

* cited by examiner

METHOD AND APPARATUS FOR PLAYING LIVESTREAMING VIDEO, ELECTRONIC DEVICE, STORAGE MEDIUM, AND PROGRAM PRODUCT

CROSS-REFERENCE TO RELATED APPLICATIONS

This application is a continuation of International Application No. PCT/CN2022/095455, filed on May 27, 2022, which claims priority to Chinese Patent Application No. 202110797382.5, filed on Jul. 14, 2021, both of which are incorporated by reference in their entirety.

FIELD OF THE TECHNOLOGY

This application relates to the technical field of the Internet, in particular to a method and apparatus for playing a livestreaming video, an electronic device, a storage medium, and a computer program product.

BACKGROUND OF THE DISCLOSURE

In related art, for a to-be-played livestreaming video, corresponding video data blocks are preloaded at a fixed time interval. When a certain livestreaming video starts to be played, a latest loaded video data block is played first, and latest livestreaming data are pulled for playing after the latest loaded video data block ends playing. However, playing of the preloaded video data block causes a mismatch in time between a played livestreaming video content and the latest livestreaming data, and consequently, phenomena such as frame skipping and lagging occur to a played livestreaming video picture.

SUMMARY

In accordance with the disclosure, there is provided a livestreaming video playing method executed by a computer device. The method includes displaying an information flow page including at least one livestreaming video. A video data block of each of the at least one livestreaming video is updated periodically in the information flow page at an update period. The method further includes playing a target video data block of a first livestreaming video of the at least one livestreaming video in response to a playing instruction for the first livestreaming video, obtaining target cache data of the first livestreaming video that belong to historical livestreaming data of the first livestreaming video at a target duration that is before a current livestreaming time point and greater than or equal to the update period, and playing the target cache data after the target video data block ends playing.

Also in accordance with the disclosure, there is provided an electronic device including a memory storing executable instructions and a processor configured to execute the executable instructions stored in the memory to display an information flow page including at least one livestreaming video. A video data block of each of the at least one livestreaming video is updated periodically in the information flow page at an update period. The processor is further configured to execute the executable instructions to play a target video data block of a first livestreaming video of the at least one livestreaming video in response to a playing instruction for the first livestreaming video, obtain target cache data of the first livestreaming video that belong to historical livestreaming data of the first livestreaming video at a target duration that is before a current livestreaming time point and greater than or equal to the update period, and play the target cache data after the target video data block ends playing.

Also in accordance with the disclosure, there is provided a non-transitory computer readable storage medium storing executable instructions that, when executed by a processor, cause the processor to display an information flow page including at least one livestreaming video. A video data block of each of the at least one livestreaming video is updated periodically in the information flow page at an update period. The instructions further cause the processor to play a target video data block of a first livestreaming video of the at least one livestreaming video in response to a playing instruction for the first livestreaming video, obtain target cache data of the first livestreaming video that belong to historical livestreaming data of the first livestreaming video at a target duration that is before a current livestreaming time point and greater than or equal to the update period, and play the target cache data after the target video data block ends playing.

DESCRIPTION OF EMBODIMENTS

In order to make objectives, technical solutions and advantages of the disclosure clearer, the disclosure will be further described in detail below with reference to accompanying drawings. The described embodiments are not to be regarded as a limitation on the disclosure, and all other embodiments obtained by those ordinarily skilled in the art without creative work fall within the scope of the disclosure.

In the following description, "some embodiments" can be a subset of all possible embodiments, but it may be understood that "some embodiments" may be the same subset or different subsets of all the possible embodiments, and may be mutually combined without conflicts.

In the following description, involved terms "first\second\third" only distinguish similar objects, and do not represent a specific order for objects, and it may be understood that "first\second\third" may be interchangeable in a specific order or a precedence order when permitted so that embodiments of the disclosure described herein can be implemented in orders in addition to an order illustrated or described herein.

Unless otherwise defined, all technical and scientific terms used herein have the same meaning as understood commonly by those skilled in the art. The terms used herein are only intended to describe embodiments of the disclosure rather than limiting the disclosure.

Before embodiments of the disclosure are described in detail, terms involved in embodiments of the disclosure are described. The terms involved in embodiments of the disclosure are suitable for the following explanation.

1) Client, which is an application program running in a terminal and used for providing various services, for example, an instant messaging client and a video playing client.

2) In response to, which is used for representing a condition or state on which a to-be-executed operation depends, when the dependent condition or state is met, one or a plurality of to-be-executed operations may be in real time, or may have a set delay, and without a special description, there is no limitation on the execution sequential order of the plurality of to-be-executed operations.

Figure 1:
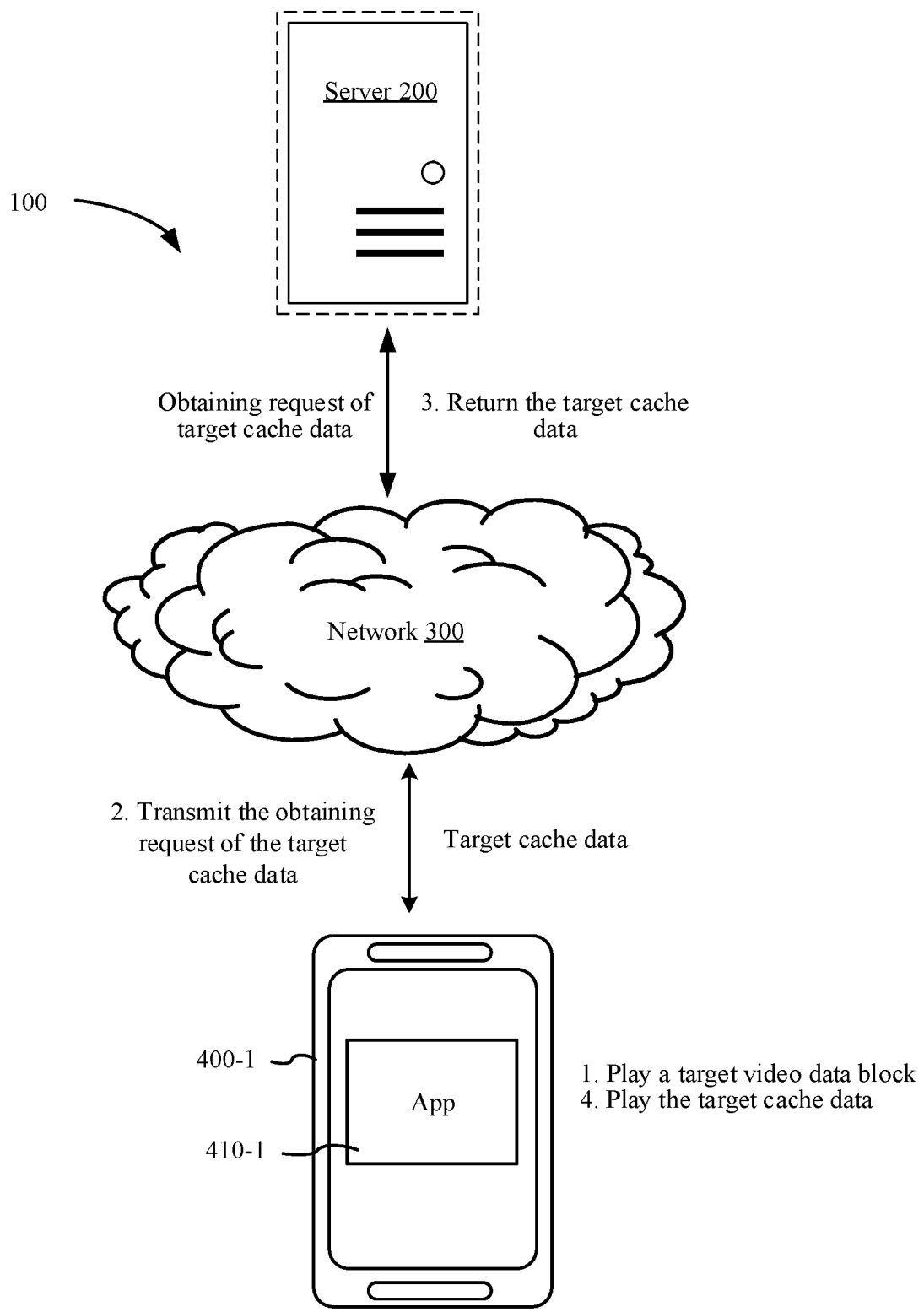
FIG. 1 is a schematic diagram showing an architecture of a system for playing a livestreaming video consistent with the disclosure.

Based on the above explanation of the nouns and the terms involved in embodiments of the disclosure, a system for playing a livestreaming video consistent with the disclosure is described below. Referring to FIG. 1, FIG. 1 is a schematic diagram showing an architecture of a system 100 for playing a livestreaming video consistent with the disclosure, in order to implement supporting an exemplary application, a terminal (a terminal 400-1 is shown as an example) is connected with a server 200 through a network 300, the network 300 may be a wide area network or a local area network, or a combination of the two, and data transmission is implemented by using a wireless or wired link.

The terminal (such as the terminal 400-1) is configured to display, in a graphical interface 410 (exemplarily shows a graphical interface 410-1), an information flow page including at least one livestreaming video, and load a video data block of each livestreaming video in the information flow page; play a target video data block corresponding to a first livestreaming video in response to a playing instruction for the first livestreaming video in the information flow page; and transmit, to the server 200, an obtaining request for target cache data corresponding to the first livestreaming video. Here, the video data block being updated periodically in the information flow page.

The server 200 is configured to receive the obtaining request for the target cache data corresponding to the first livestreaming video; and return the target cache data in response to the obtaining request. Here, the target cache data belong to historical livestreaming data of the first livestreaming video at a target duration before a current livestreaming time point, and the target duration is greater than or equal to an update period of the video data block.

The terminal (such as the terminal 400-1) is configured to receive the returned target cache data, and play the target cache data after the target video data block ends playing.

In actual application, the server 200 may be an independent physical server, or a server cluster composed of a plurality of physical servers or a distributed system, or a cloud server providing a cloud service, a cloud database, a cloud computing, a cloud function, cloud storage, a network service, cloud communication, a middleware service, a domain name service, a security service, a content delivery network (CDN), big data, an artificial intelligence platform and other basic cloud computing services. The terminal (such as the terminal 400-1) may be a smartphone, a tablet computer, a notebook computer, a desktop computer, a smart speaker, a smart television, a smartwatch and the like and is not limited to these. The terminal (such as the terminal 400-1) and the server 200 may be connected directly or indirectly in a wired or wireless communication mode, which is not limited here.

Figure 2:
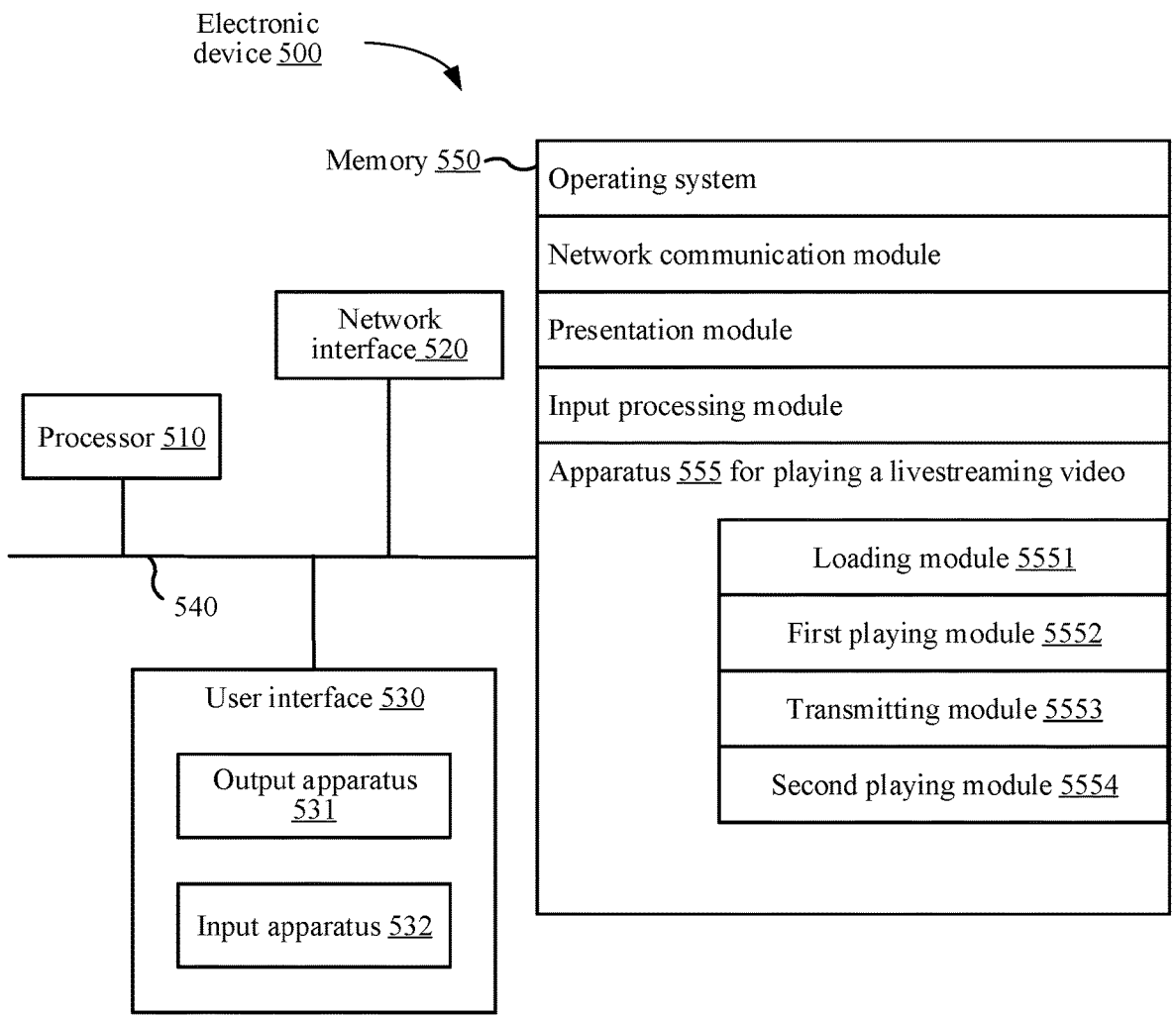
FIG. 2 is a schematic structural diagram of an electronic device for implementing a method for playing a livestreaming video consistent with the disclosure.

Referring to FIG. 2, FIG. 2 is a schematic structural diagram of an electronic device 500 for implementing a method for playing a livestreaming video consistent with the disclosure. In actual application, the electronic device 500 may be the server or the terminal shown in FIG. 1. Taking the electronic device 500 being the terminal shown in FIG. 1 as an example, the electronic device for implementing the method for playing the livestreaming video consistent with the disclosure is described. The electronic device 500 consistent with the disclosure includes: at least one processor 510, a memory 550, at least one network interface 520 and a user interface 530. All components in the electronic device 500 are coupled together through a bus system 540. It may be understood that the bus system 540 is configured to realize connection communication among these components. The bus system 540 further includes a power bus, a control bus and a status signal bus in addition to a data bus. However, for the sake of clear description, in FIG. 2, various buses are marked as the bus system 540.

The processor 510 may be an integrated circuit chip and has a signal processing capability, for example, a general-purpose processor, a digital signal processor (DSP), or other programmable logic devices, a discrete gate or transistor logic device, a discrete hardware component and the like. The general-purpose processor may be a microprocessor or any suitable processor and the like.

The user interface 530 includes one or more output apparatuses 531 capable of presenting a media content, including one or more speakers and/or one or more visual display screens. The user interface 530 further includes one or more input apparatuses 532, including a user interface part helping user input, for example, a keyboard, a mouse, a microphone, a touch display screen, a camera, other input buttons and controls.

The memory 550 may be removable, unremovable or a combination of the both. An exemplary hardware device includes a solid state memory, a hard disk drive, an optical driver and the like. In some embodiments, the memory 550 includes one or more storage devices physically located away from the processor 510.

The memory 550 includes a volatile memory or a non-volatile memory, and may also include the both. The non-volatile memory may be a read only memory (ROM), and the volatile memory may be a random access memory (RAM). The memory 550 described consistent with the disclosure intends to include any proper type of memory.

In some embodiments, an apparatus for playing a livestreaming video consistent with the disclosure may be implemented in a form of software. FIG. 2 shows the apparatus 555 for playing the livestreaming video stored in the memory 550, and the apparatus may be software in a form of a program, a plug-in and the like and includes the following software modules: a loading module 5551, a first playing module 5552, a transmitting module 5553 and a second playing module 5554. These modules are logic, so that they may be combined at will or further split according to implemented functions, and functions of all the modules will be described below.

In some other embodiments, the apparatus for playing the livestreaming video consistent with the disclosure may be implemented in a form of combining software and hardware. As an example, the apparatus for playing the livestreaming video consistent with the disclosure may be a processor in a form of a hardware decoding processor, which is programmed to execute a method for playing a livestreaming video consistent with the disclosure. For example, the processor in the form of the hardware decoding processor may adopt one or more application specific integrated circuits (ASICs), DSPs, programmable logic devices (PLDs), complex programmable logic devices (CPLDs), field-programmable gate arrays (FPGAs) or other electronic elements.

Figure 3:
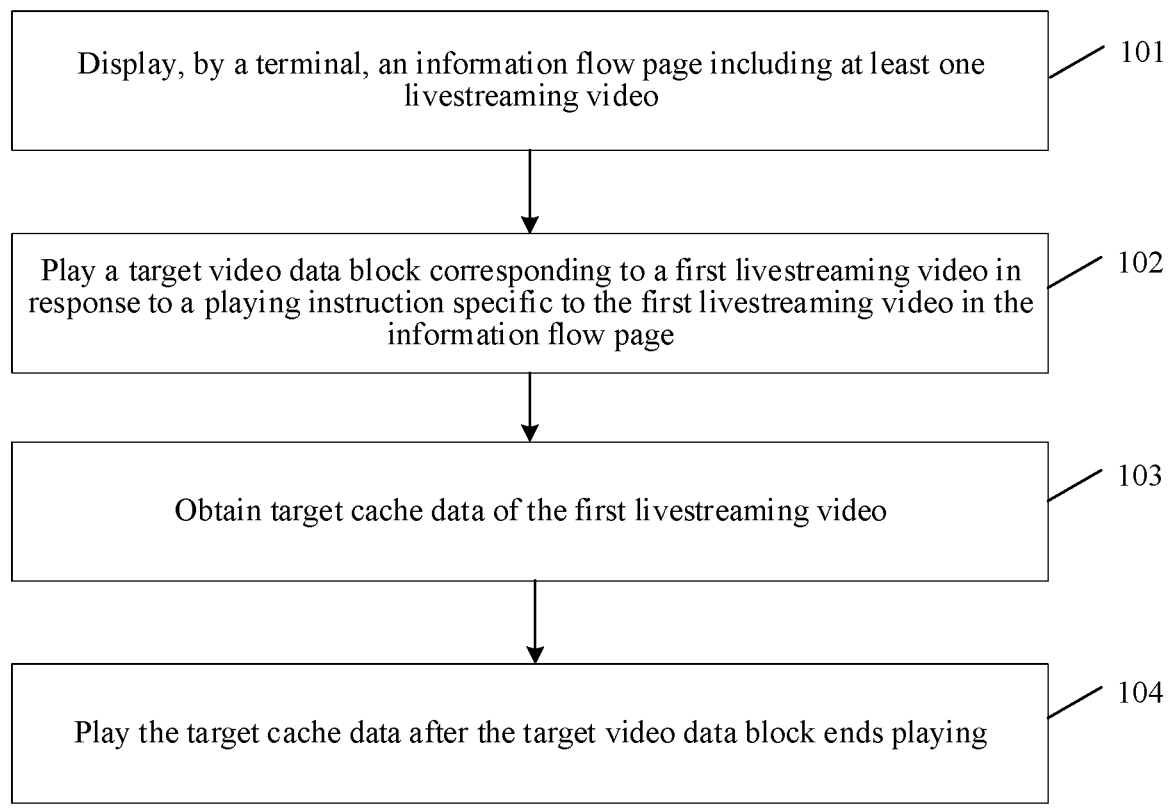
FIG. 3 is a schematic flowchart of a method for playing a livestreaming video consistent with the disclosure.

The method for playing the livestreaming video consistent with the disclosure is described below based on the above descriptions of the system for playing the livestreaming video and the electronic device provided by embodiments of the disclosure. In some embodiments, the method for playing the livestreaming video consistent with the disclosure may be implemented independently by a server or a terminal, or implemented by cooperation of the server or the terminal, and the method for playing the livestreaming video consistent with the disclosure is described below by taking implementation by the terminal as an example. Referring to FIG. 3, FIG. 3 is a schematic flowchart of the method for playing the livestreaming video consistent with the disclosure, the method for playing the livestreaming video consistent with the disclosure includes:

Step 101: Display, by the terminal, an information flow page including at least one livestreaming video.

Here, in actual application, one or more (namely, at least two) livestreaming videos may be displayed in the information flow page, each livestreaming video is composed of a series of consecutive multiple video data blocks, sizes of all the video data blocks may be the same or not, and the terminal may periodically load the video data blocks of each livestreaming video in the information flow page after displaying the information flow page. That is, the video data blocks have an update period in the information flow page, and the video data blocks are updated periodically in the information flow page.

Here, the terminal is provided with a client having a livestreaming function, for example, a livestreaming client, an instant messaging client, and the like. A host end may perform livestreaming through a terminal provided with a client, a livestreaming video is transmitted to a background server in real time and then forwarded to a viewer end through the background server, and thus the viewer end can view the livestreaming video through the arranged client. When a running instruction for the client is received, the terminal runs the client and displays the information flow page including the livestreaming video, there may be one or more livestreaming videos in the information flow page, and a user may update the presented livestreaming videos in the information flow page by swiping the information flow page, to view more livestreaming videos.

When the terminal displays the information flow page including at least one livestreaming video, the video data block of each livestreaming video in the information flow page may be preloaded, to avoid loading wait time when the user plays a certain livestreaming video, realize fast viewing of the livestreaming videos, and improve user experience of livestreaming viewing. In actual application, the video data block corresponds to a video clip of a preset duration contained in the corresponding livestreaming video, for example, the video data block may be video data of a video clip of 30 s.

In actual application, the video data block of each livestreaming video is updated periodically in the information flow page, the update period of periodical updating may be preset, for example, the update period may be 30 seconds, that is, the video data block of each livestreaming video in the information flow page is updated at intervals of 30 seconds. Specifically, one video data block of each livestreaming video may be loaded at intervals of 30 seconds, and the video data block loaded every time of the livestreaming video contains livestreaming video data at the current livestreaming time point.

In some embodiments, the terminal may load the video data block of each livestreaming video in the information flow page in the following modes: a first video data block of each livestreaming video in the information flow page is loaded; whether a playing instruction for each livestreaming video is received is detected within the update period of the video data block; and when the playing instruction for each livestreaming video is not detected, and it is determined that an update time point of the video data block is up based on the update period and a loading time point of the first video data block, a second video data block of each livestreaming video is loaded, and a cache space corresponding to the first video data block is released.

Here, the terminal loads the first video data block of each livestreaming video in the information flow page, after loading is completed, within the update period of the video data block, such as within the update period of 30 seconds, whether the playing instruction for the livestreaming video (such as a certain livestreaming video in the information flow page) is received is detected. When the playing instruction for the livestreaming video is detected, the video data block of the livestreaming video is played; and when the playing instruction for the livestreaming video is not detected, whether the update time point of the video data block is up is determined according to the update period of the video data block and a loading time point of the first video data block (that is, the update time point of the first video data block). When it is determined that the update time point of the video data block is up, a second video data block of each livestreaming video is loaded.

In actual application, after the second video data block of each livestreaming video is loaded, a cache space corresponding to the first video data block may be released, so that occupied storage space is reduced, and a utilization ratio of storage space is increased.

In some embodiments, the terminal may load the video data block of each livestreaming video in the information flow page in the following modes. The following processing is executed respectively for each livestreaming video in the information flow page: a first obtaining request for obtaining the video data block of the livestreaming video is transmitted; a target Internet protocol address returned based on the first obtaining request is received, where a geographical location of a service node corresponding to the target Internet protocol address matches a geographical location of the terminal displaying the information flow page; and the video data block of the livestreaming video is pulled and loaded from the service node based on the target Internet protocol address.

Here, the following processing may be executed for each livestreaming video in the information flow page to load the video data block of each livestreaming video:

the terminal may transmit the first obtaining request for obtaining the video data block of the livestreaming video, for example, the first obtaining request is transmitted to a background service node corresponding to the livestreaming video, so that the video data block of the livestreaming video is obtained from the background service node.

In some embodiments, the terminal may transmit the first obtaining request for obtaining the video data block of the livestreaming video in the following modes: a video playing address corresponding to the information flow page is obtained, the video playing address corresponding to an Internet protocol address of a service management node; and based on the video playing address, a service management interface is invoked to transmit the first obtaining request to the service management node, the first obtaining request being used for determining, by the service management node, the service node whose geographical location matches the geographical location where the terminal is located and returning the target Internet protocol address of the determined service node.

Here, in actual application, the background service node may be a service node cluster, and the service node cluster contains at least two service nodes, including a main service node and a slave service node. The main service node serves as the service management node and is configured to implement managing the slave service node in the service node cluster, and the main service node (the service management node) may be preset, or selected through an election mechanism. The service node cluster is configured to provide pulling of video data for each livestreaming video of the information flow page, that is, services such as pulling video source data from a video source server, storage or caching of the video data, and issuing of the video data. The terminal, when transmitting the first obtaining request, may transmit the first obtaining request to the service node cluster, for example, the first obtaining request is transmitted to the main service node, namely, the service management node, of the service node cluster, thus, the Internet protocol address of the service management node needs to be obtained firstly, so that the first obtaining request is transmitted to the service management node based on the Internet protocol address.

During actual implementation, the terminal obtains the Internet protocol address of the service management node by obtaining the video playing address corresponding to the information flow page. Therefore, based on the video playing address, the service management interface is invoked to transmit the first obtaining request to the service management node. The service management node receives the first obtaining request, determines, from the service node cluster, the service node whose geographical location matches the geographical location where the terminal is located, and returns the target Internet protocol address of the determined service node.

In some embodiments, the service management node obtains the geographical location where the terminal is located and determines a distance between the geographical location where the terminal is located and a geographical location of each service node, and determines a target service node whose distance meets a distance condition as the service node whose geographical location matches the geographical location where the terminal is located; or the service management node may preset a service location region corresponding to each service node, determine a service location region of which service node does the geographical location of the terminal belongs to, so that a service node corresponding to the service location region to which the geographical location where the terminal is located belongs is determined as the service node whose geographical location matches the geographical location where the terminal is located.

Here, the distance condition is described. In actual application, the distance condition may be preset. For example, a distance threshold is set, when the distance between the geographical location where the terminal is located and the geographical location of the service node is smaller than the distance threshold, it is determined that the distance meets the distance condition; or a distance interval is set, when the distance between the geographical location where the terminal is located and the geographical location of the service node is within the set distance interval, it is determined that the distance meets the distance condition.

The terminal receives the target Internet protocol address returned by the service management node, and pulls and loads the video data block of the livestreaming video from the service node based on the target Internet protocol address.

Step 102: Play a target video data block of the first livestreaming video in response to the playing instruction for the first livestreaming video in the information flow page.

Here, after the terminal displays the information flow page including the at least one livestreaming video and loads the video data block of each livestreaming video, the user may trigger the playing instruction for the livestreaming video by executing a triggering operation, such as a click operation, for the livestreaming video, to play the video data block of the livestreaming video, and thus viewing of the livestreaming video is implemented. When the terminal receives the playing instruction for the first livestreaming video in the information flow page, the target video data block of the first livestreaming video is played in response to the playing instruction for the first livestreaming video.

Here, the target video data block of the first livestreaming video may be the video data block of the first livestreaming video which is already preloaded by the terminal.

In some embodiments, the terminal, after displaying the information flow page including the at least one livestreaming video, may also present a playing function item of each livestreaming video in the information flow page.

Correspondingly, the terminal may play the target video data block of the first livestreaming video in the following mode: the playing instruction for the first livestreaming video is received, the playing instruction is triggered based on a playing function item corresponding to a target playing video, and the terminal plays the target video data block of the first livestreaming video in response to the playing instruction.

In actual application, the terminal, after displaying the information flow page including the at least one livestreaming video, may present the playing function item corresponding to each livestreaming video in the information flow page, receives the playing instruction for the first livestreaming video in response to a triggering operation for the playing function item of the first livestreaming video, and plays the target video data block of the first livestreaming video in response to the playing instruction.

In some embodiments, the terminal, after displaying the information flow page including the at least one livestreaming video, may also present loading prompt information corresponding to each livestreaming video in the information flow page. The loading prompt information is used for prompting that the video data block of the corresponding livestreaming video is loaded successfully.

In actual application, the terminal may also present the loading prompt information corresponding to each livestreaming video in the information flow page to prompt the user that the video data block of the corresponding livestreaming video has been successfully loaded through the loading prompt information. Therefore, the user may be assisted in preferably selecting the livestreaming video which has ended loading for viewing to avoid wait time.

Figure 4:
FIG. 4 is a schematic diagram showing an information flow page consistent with the disclosure.

As an example, referring to FIG. 4, FIG. 4 is a schematic diagram showing the information flow page consistent with the disclosure. Here, in the information flow page, the playing function item "play" corresponding to each livestreaming video is presented, and the corresponding loading prompt information "preloaded" is presented for the livestreaming video whose video data block has been successfully loaded. In response to the triggering operation for the playing function item "play" of the first livestreaming video, the playing instruction for the first livestreaming video is received, and the target video data block corresponding to the first livestreaming video is played.

Step 103: Obtain target cache data of the first livestreaming video.

The target cache data belong to historical livestreaming data of the first livestreaming video at a target duration before a current livestreaming time point, and the target duration is greater than or equal to the update period of the video data block.

Here, the terminal, while playing the target video data block corresponding to the first livestreaming video, may obtain the target cache data of the first livestreaming video in the following mode: an obtaining request for the target cache data of the first livestreaming video is transmitted, and the returned target cache data are received. The target cache data belong to the historical livestreaming data of the first livestreaming video at the target duration before the current livestreaming time point, the target duration is greater than or equal to the update period of the video data block, to guarantee that the target video data block may be connected with the historical livestreaming data, and the phenomena such as frame skipping and lagging are avoided.

During actual implementation, the terminal may transmit the obtaining request to the background server of the livestreaming video. The background server, after receiving the obtaining request, obtains the historical livestreaming data of the cached first livestreaming video at the target duration before the current playing time point, to use all data in the historical livestreaming data, or part of the historical livestreaming data being connected with the target video data block in a playing time point as the target cache data to be returned to the terminal.

Step 104: Play the target cache data after the target video data block ends playing.

Here, the terminal receives the returned target cache data and plays the target cache data after the target video data block ends playing.

In some embodiments, the obtaining request carries a playing end time point corresponding to the target video data block, and the playing end time point may be obtained in the following mode: the target video data block is parsed to obtain the playing end time point corresponding to the target video data block.

Correspondingly, the terminal may receive the returned target cache data in the following mode: the returned target cache data are received, and a playing start time point of the target cache data is after and adjacent to the playing end time point.

In actual application, the obtaining request transmitted by the terminal may carry the playing end time point corresponding to the target video data block. In some embodiments, the playing end time point is determined in the following mode: the terminal, while playing the target video data block, parses the target video data block to obtain a playing time point corresponding to the target video data block, the playing time point may include a playing time point corresponding to each video frame corresponding to the target video data block, and based on this, the playing end time point corresponding to the target video data block may be determined.

Correspondingly, when the transmitted obtaining request carries the playing end time point corresponding to the target video data block, the playing start time point of the target cache data received by the terminal is after and adjacent to the playing end time point. In this way, it is guaranteed that after the terminal ends playing the target video data block, the played target cache data may be seamlessly connected with the target video data block, to avoid occurrence of the phenomena of video frame skipping and lagging.

In some embodiments, the terminal may transmit the obtaining request for the target cache data corresponding to the first livestreaming video in the following mode: the obtaining request for the target cache data corresponding to the first livestreaming video is transmitted to the service management node, where the obtaining request is used for querying, by the service management node, a plurality of service nodes that cache the historical livestreaming data, and selects a target service node from the plurality of service nodes.

Correspondingly, the terminal may receive the returned target cache data in the following mode: the target cache data returned by the target service node are received.

Here, the terminal transmits the obtaining request for the target cache data corresponding to the first livestreaming video to the service management node in the service node cluster; then the service management node queries the plurality of service nodes where the historical livestreaming data of the first livestreaming video are cached and then selects the target service node from the plurality of service nodes. In some embodiments, the target service node matching the geographical location where the terminal is located may be selected from the plurality of service nodes according to the geographical location where the terminal is located. In this way, the service management node preferably considers the service node where the historical livestreaming data of the first livestreaming video are already cached, a utilization ratio of resources may be increased, and pulling the video data from the video source server repeatedly is avoided.

In some embodiments, the terminal may play the target cache data in the following mode: a target playing speed corresponding to the target cache data is obtained; and after the target video data block ends playing, a current playing speed (that is, a playing speed of playing the target video data block) is adjusted to the target playing speed, and the target cache data are played based on the target playing speed; where the target playing speed is greater than the current playing speed.

Here, after the terminal ends playing the target video data block, the played target cache data are the historical livestreaming data, so delay exists between the played video data and the livestreaming data at the current playing time point. Therefore, consistent with the disclosure, the target cache data, when being played, are played at the target playing speed greater than the current playing speed. In some embodiments, the current playing speed is adjusted to the target playing speed, and the target cache data are played based on the target playing speed.

In some embodiments, the terminal may obtain the target playing speed corresponding to the target cache data in the following modes: a playing duration of the target cache data is obtained; and a playing duration interval to which the playing duration belongs is determined, and a playing speed corresponding to the playing duration interval is used as the target playing speed.

In actual application, the playing duration of the target cache data may be obtained, then the playing duration interval to which the playing duration belongs is determined, and thus the playing speed corresponding to the playing duration interval is used as the target playing speed. Here, the playing duration interval may be preset, such as 0 s to 5 s, 6 s to 10 s, and 11 s to 15 s, and then the corresponding playing speed is set for each playing duration interval, for example, 0 s to 5 s corresponds to 1.1-times multiplied speed.

In some embodiments, the terminal may play the livestreaming data at the current livestreaming time point in the following modes: in a process of playing the target cache data at the target playing speed, the obtaining request for the livestreaming data of the first livestreaming video corresponding to the current livestreaming time point is transmitted; the returned livestreaming data at the current livestreaming time point are received, and after the target cache data end playing, the target playing speed is adjusted to a standard playing speed; and the livestreaming data at the current livestreaming time point are played at the standard playing speed.

In actual application, in the process that the terminal plays the target cache data at the target playing speed, the terminal obtains the livestreaming data of the first livestreaming video corresponding to the current livestreaming time point, to continue to play the livestreaming data at the current livestreaming time point after the target cache data end playing, and thus delay between the played video and a livestreaming content at the current livestreaming time point is reduced or eliminated.

In some embodiments, in the process that the terminal plays the target cache data at the target playing speed, the terminal may transmit the obtaining request for the livestreaming data of the first livestreaming video corresponding to the current livestreaming time point to a server configured to provide a livestreaming service, such as the above target service node providing the target cache data. The server, after receiving the obtaining request, returns the livestreaming data at the current livestreaming time point to the terminal in response to the obtaining request. The terminal receives the returned livestreaming data at the current livestreaming time point, and adjusts the target playing speed to the standard playing speed after the target cache data end playing. For example, two-times multiplied speed playing is adjusted to the standard playing speed (that is, one-times multiplied speed playing), and thus the livestreaming data at the current livestreaming time point are played at the standard playing speed.

In some embodiments, in the process that the terminal plays the first livestreaming video, the terminal plays a loaded video data block of a second livestreaming video in response to switching from the first livestreaming video to the second livestreaming video, and transmits an obtaining request for cache data corresponding to the second livestreaming video, where the cache data belong to historical livestreaming data of the second livestreaming video at a target duration before the current livestreaming time point; and returned cache data are received, and the cache data are played after the loaded video data block of the second livestreaming video ends playing.

Figure 10:
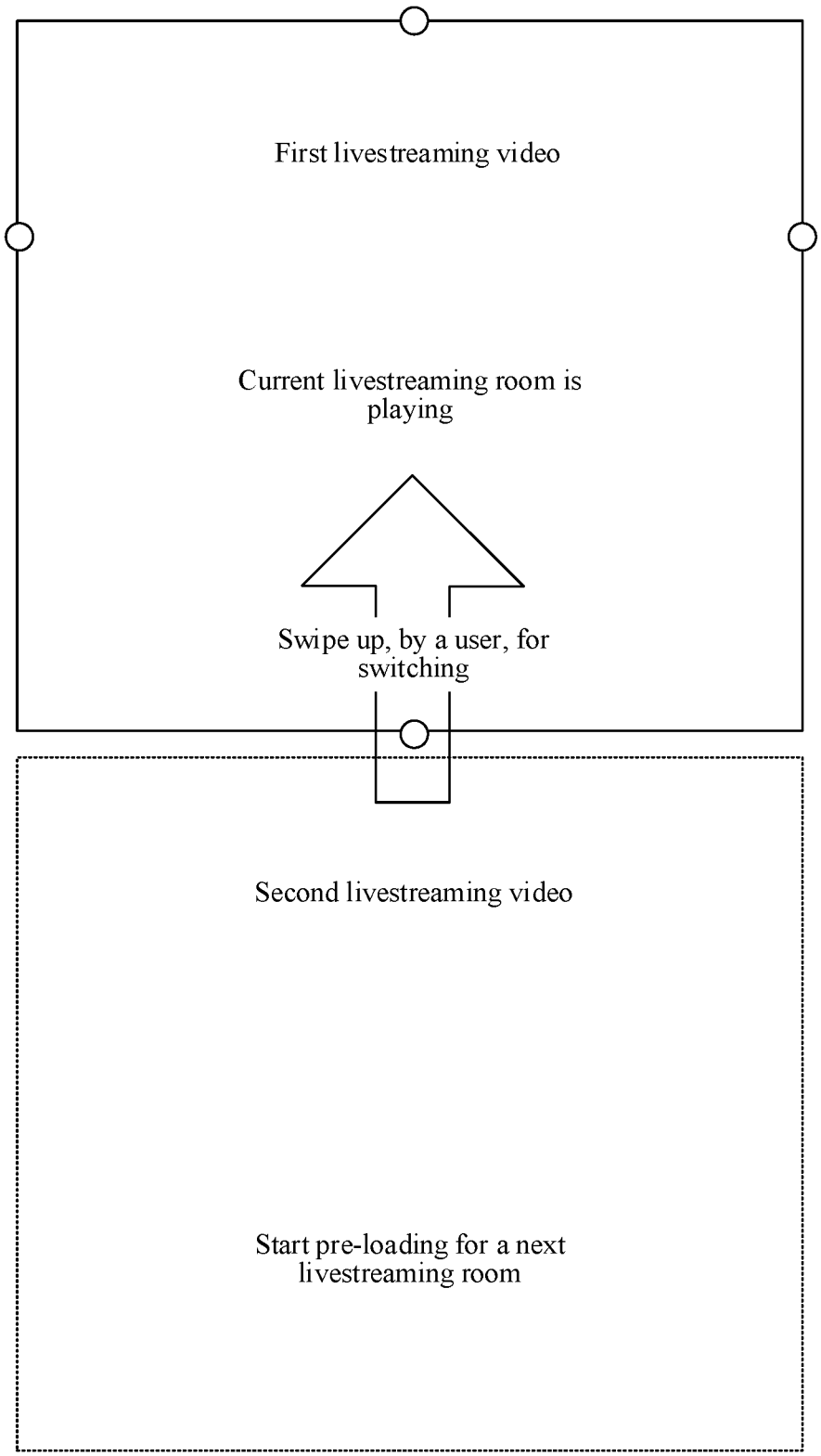
FIG. 10 is a schematic diagram showing switching livestreaming videos by switching livestreaming rooms up and down consistent with the disclosure.

Here, the terminal, after playing the first livestreaming video, may also switch from the first livestreaming video to the second livestreaming video to realize viewing of the second livestreaming video. During actual implementation, the terminal may play the first livestreaming video through a livestreaming interface, at the moment, a livestreaming video presented in the livestreaming interface may be switched in an up-and-down swiping mode, that is, the first livestreaming video is switched to the second livestreaming video. Referring to FIG. 10, the user switches from a current livestreaming room to a next livestreaming room in a swiping-up mode, that is, the first livestreaming video in the current livestreaming room is switched to the second livestreaming video in the next livestreaming room. Certainly, in some embodiments, the terminal may also exit the first livestreaming video which is playing currently to return to the information flow page, and then trigger a playing instruction for the second livestreaming video to implement switching from the first livestreaming video to the second livestreaming video.

In actual application, in the process that the terminal plays the first livestreaming video, the terminal, when switching from the first livestreaming video to the second livestreaming video, may play the loaded video data block of the second livestreaming video, and meanwhile transmit the obtaining request for the cache data corresponding to the second livestreaming video, so that the cache data returned based on the obtaining request are received, and then the cache data are played after the loaded video data block of the second livestreaming video ends playing. Here, the cache data belong to the historical livestreaming data of the second livestreaming video at the target duration before the current livestreaming time point.

By applying the above embodiments of the disclosure, the loaded video data block of each livestreaming video in the information flow page is updated according to the update period. When the playing instruction for the first livestreaming video is received, the target video data block of the first livestreaming video is played first, meanwhile, the target cache data corresponding to the first livestreaming video are further obtained, and the target cache data are played after the target video data block ends playing. Here, the target cache data belong to the historical livestreaming data of the first livestreaming video at the target duration before the current livestreaming time point, after the video data block ends playing, the target cache data belonging to the historical livestreaming data may be played, moreover, as the target duration is greater than or equal to the update period of the video data block, the target cache data and the played video data block are connected, thus, the occurrence of the phenomena of video frame skipping and lagging caused by directly pulling latest livestreaming data at a current time point is reduced, and the smoothness of playing the livestreaming video is improved.

An exemplary application of embodiments of the disclosure in an actual application scene will be described below.

In the related art, the terminal, when playing the livestreaming video, usually adopts a multi-player solution, i.e., using a plurality of players. When the current livestreaming video is playing, a video stream of a next video is pre-pulled through a playing address, and the video stream only downloads a video rather than playing the video. When the user switches to this video, a pre-downloaded video is decoded and played to realize a function of fast playing the next video. However, when two video streams are pulled at the same time, a video bit rate is large, there are the plurality of players, more internal memory, CPU, bandwidths and other terminal device resources are occupied, available resources of a current terminal device are reduced, situations such as high power consumption, heating and lagging of a microphone may be caused, and user terminal experience is reduced to a certain degree. Besides, the terminal, when playing the livestreaming video, also adopts a solution of "a single player+pre-downloading." In some embodiments, a current player plays a current video, one video data block is downloaded with a downloader through a playing address of a next video, and then downloading stops. Another video data block is downloaded at interval of one minute. And so on. When the user switches to play this playing address, this video data block is played first, after the video data block ends playing, the latest livestreaming video at the current livestreaming time point is directly pulled, at the moment, a video picture may skip, and a picture of the video data block is not connected with the latest livestreaming video.

Based on this, the disclosure further provides a method for playing a livestreaming video to solve the above problems. In some embodiments, a current player plays a current video, one small video block is downloaded with a downloader through a playing address of a next video, and then downloading stops. Another video data block is downloaded at intervals of 30 s, and so on. When the user switches to play this playing address, this video data block is played first, after the video data block ends playing, pre-cached latest livestreaming video data are requested from a background server through a seamless connection technology based on an end timespan of the video data block, thus, a video picture behind the video data block continues playing, a seamless connection may be realized, and a video frame does not skip; and meanwhile, delay is reduced by playing the video picture behind the video data block at the multiplied speed. According to the method for playing the livestreaming video consistent with the disclosure, in combination with IP aggregation and an accurate flow pulling solution of a server end, through technologies such as local pre-loading of the terminal, demultiplexing and multiplied speed playing by the players, the video frame does not skip, delay is reduced, user experience is improved, and the method may be applied to an online livestreaming video scene. The method for playing the livestreaming video consistent with the disclosure includes an IP aggregation content delivery technology, an accurate flow throughput technology and a multiplied speed playing technology, which are described respectively below.

First, IP aggregation content delivery technology.

Figure 5:
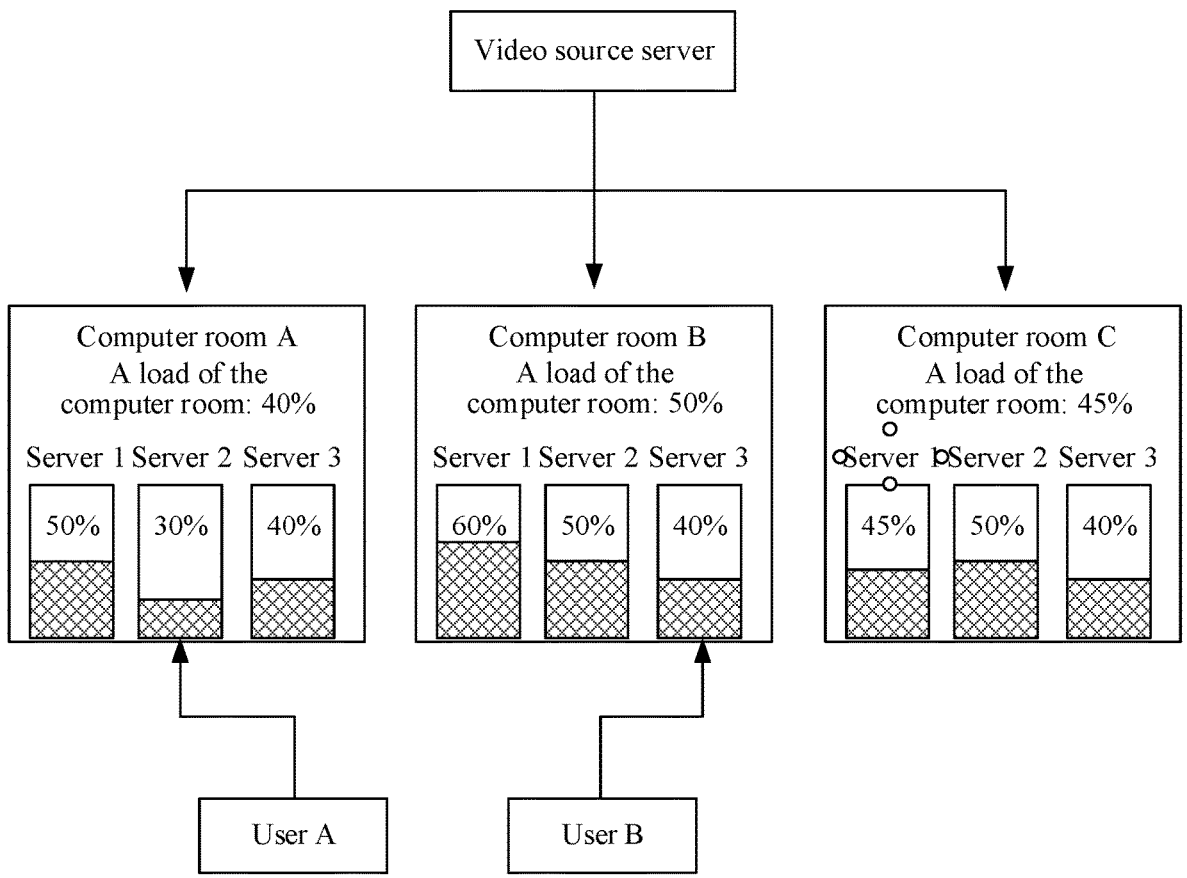
FIG. 5 is a schematic diagram showing a content delivery mechanism.

As for a CDN content delivery mechanism in the related art, when a user requests to pull a video stream, in the same network region, it is connected to a computer room with a low load, and a low server device in the computer room is used. As shown in FIG. 5, FIG. 5 is a schematic diagram showing an example content delivery mechanism. Here, the network region contains three server computer rooms (a computer room A, a computer room B and a computer room C respectively), and loads of all the computer rooms are respectively: 40%, 50% and 45%. When the user needs to obtain a video source, according to a load balance, the user is connected to the computer room A, this is because the load of the computer room A is lowest. After being connected to the computer room A, there are three server devices (including a server 1, a server 2 and a server 3) in the computer room A, according to a load condition of the three server devices, the user is connected to the server device 2 (because the load of the server device 2 is lowest), and a video content on the server device 2 will be pulled from the video source server and then delivered to the user. That is to say, a whole principle that the user is connected to a CDN server is: using a device with a lowest load. A next user views the same video and is possibly connected to the server device 3, there is no such video data on the server device 3, so the video data need to be pulled from the video source server, resulting in redundancy of resources of the server device 2 and the server device 3. The same video is viewed, but the same video data are not repeatedly used, resulting in resource waste.

Figure 6:
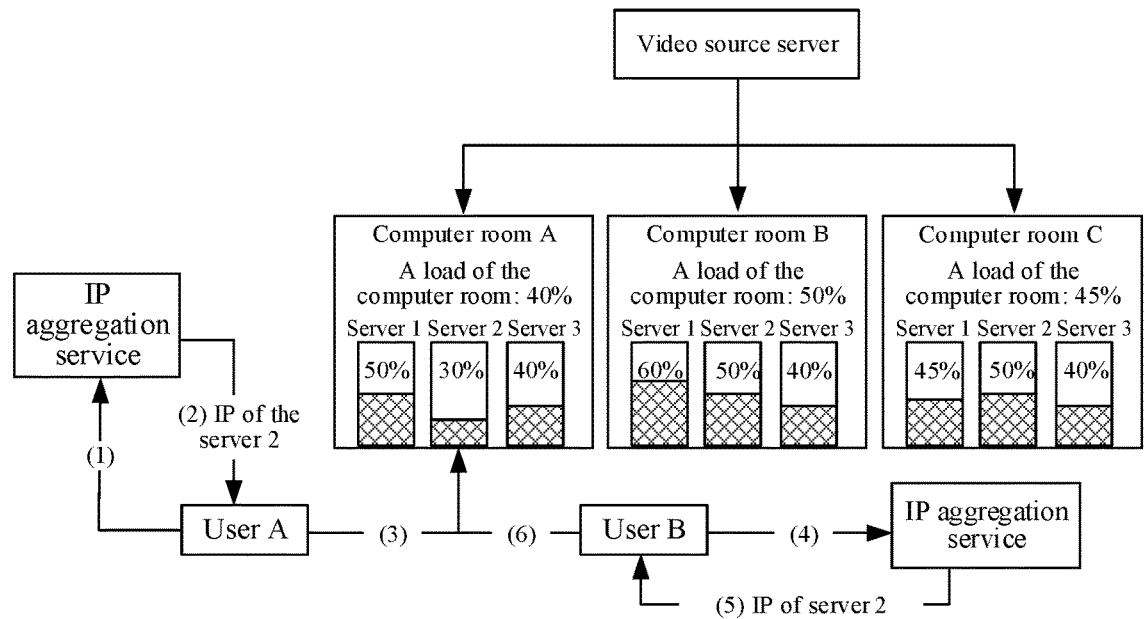
FIG. 6 is a schematic diagram showing a content delivery mechanism consistent with the disclosure.

Based on this, the disclosure provides a content delivery solution based on an IP aggregation technology. In some embodiments, through the IP aggregation technology, users in the same network region may be gathered in one server computer room, so that server sources having accurate flow throughput can be fully utilized, and a better effect is achieved. As shown in FIG. 6, FIG. 6 is a schematic diagram showing the content delivery mechanism consistent with the disclosure. Here, (1) a user A needs to view the livestreaming video and requests for an IP aggregation service; (2) the IP aggregation service returns an IP address of "a server 2 of a computer room A" to the user A; (3) the user A finds out "the server 2 of the computer room A" through the IP address, and pulls a video stream from the server 2 to play; (4) a user B also intends to view the livestreaming video and requests for the IP aggregation service; (5) under the condition that "the server 2 of the computer room A" is not in a full load, the IP aggregation service also returns the IP address of "the server 2 of the computer room A" to the user B; and (6) the user B also pulls the video stream from the server 2 to play. In this way, the same video data in the server 2 are fully utilized.

Second, accurate flow throughput technology.

Figure 7:
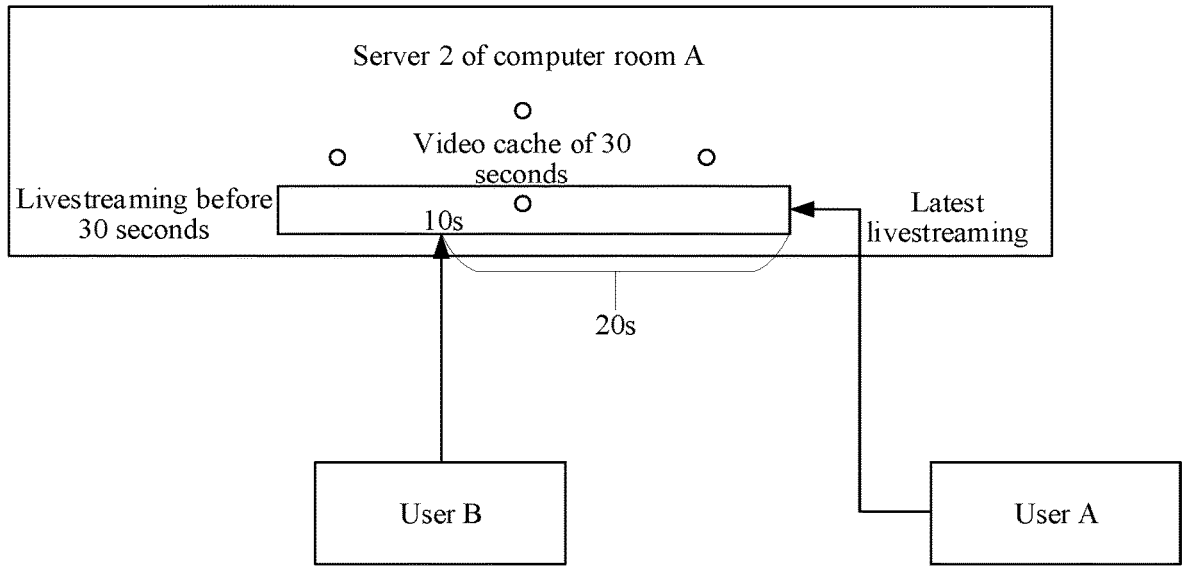
FIG. 7 is a schematic diagram showing cache data of a livestreaming video consistent with the disclosure.

As shown in FIG. 7, FIG. 7 is a schematic diagram showing cache data of the livestreaming video consistent with the disclosure. Here, the user requests for a livestreaming video content, and a server providing content delivery may cache video cache data of 30 seconds. In some embodiments, the user A plays the livestreaming video through "the server 2 of the computer room A," and in a playing process, the server 2 may cache a livestreaming video stream of last 30 seconds, namely, the video cache data. When the user B plays the livestreaming video through "the server 2 of the computer room A," first, a pre-loaded video data block corresponding to the livestreaming video is played, and meanwhile, the cached video cache data are requested from the server 2. In some embodiments, based on a timespan of the video data block, to-be-played video cache data after the video data block are obtained, thus, after the video data block ends playing, the video cache data continues to play. In some embodiments, according to the timespan, the video cache data corresponding to the timespan are continued to start to play, for example, video cache data at the tenth second may start to play. In this way, seamless connection playing of the video is realized, that is, as long as there is one user to play the livestreaming in one network region, video seamless connection may be experienced by the other users in the network region when playing the livestreaming.

Third, multiplied speed playing technology.

Figure 8:
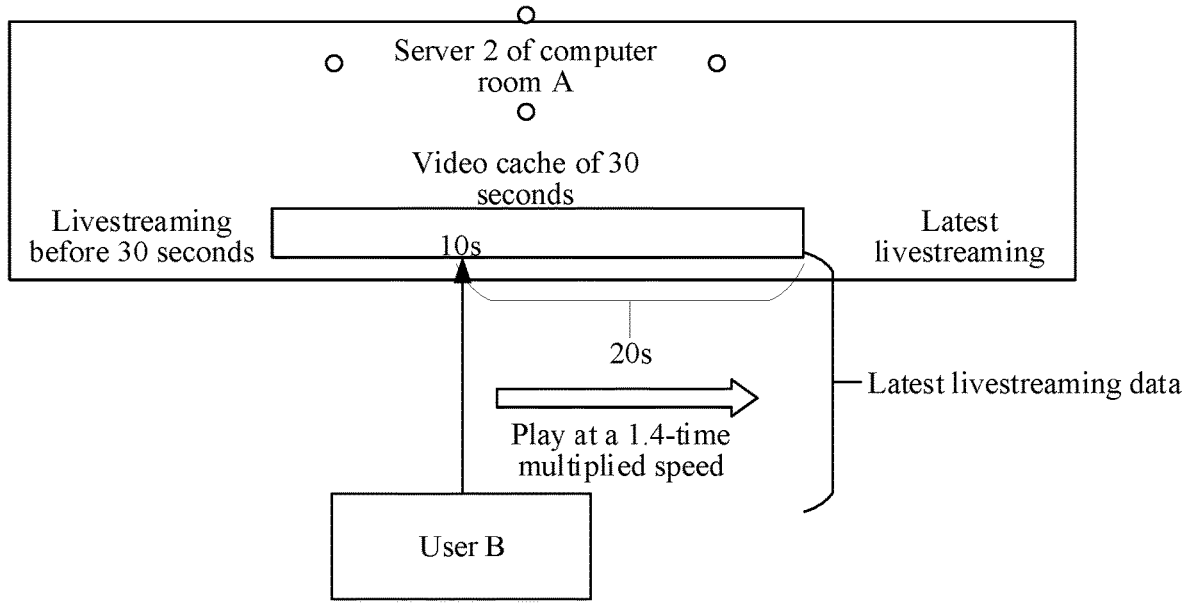
FIG. 8 is a schematic diagram showing playing at a multiplied speed consistent with the disclosure.

As shown in FIG. 8, FIG. 8 is a schematic diagram showing multiplied speed playing consistent with the disclosure. Here, accurate flow throughput may bring high delay, that is, when the user B starts to play from a cache position of the tenth second, delay of twenty seconds exists between a video played by the user B and a latest livestreaming video corresponding to a current livestreaming time point. At the moment, the user B plays through a player at the multiplied speed, for example, a 1.4-times multiplied speed is set, the livestreaming delay of 20 seconds will be slowly reduced, thereby finally achieving being synchronous with the latest livestreaming data.

Figure 9:
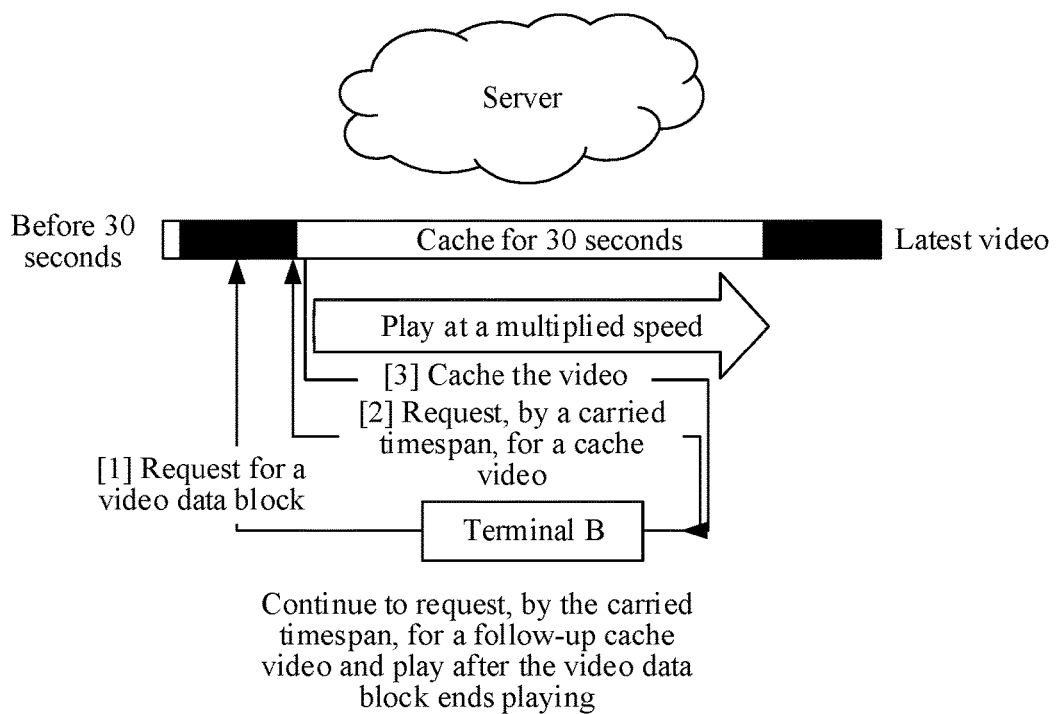
FIG. 9 is a schematic diagram showing a method for playing a livestreaming video consistent with the disclosure.

Taking playing of a livestreaming video in a livestreaming information flow page (namely, a livestreaming Feeds page) as an example, the method for playing the livestreaming video consistent with the disclosure is described below in detail. Referring to FIG. 9, FIG. 9 is a schematic diagram showing the method for playing the livestreaming video consistent with the disclosure, here:

(1) the user enters the information flow page, and a terminal obtains video playing addresses of all livestreaming videos in the information flow page, for example, "http://ip:port/id.flv."

(2) The terminal transmits a video data obtaining request for the livestreaming video to the IP aggregation service through an IP aggregation interface.

(3) The IP aggregation service issues an IP address of the same OC server, namely, oc_ip, to all terminals playing the livestreaming video in the same network region through the IP aggregation interface, at the moment, the terminal modifies a player address from "http://ip:port/id.flv" to "http://oc_ip:port/id.flv," and a video data obtaining request is initiated to the same server, namely, an OC request.

(4) The terminal downloads the video data block corresponding to each livestreaming video based on a playing address "http://oc_ip:port/id.flv" of each livestreaming video through a pre-loading module, and the video data block may contain a video content of 2 seconds.

(5) When the user does not operate the information flow page within the update period (such as within 30 seconds) of one video data block, a new video data block is downloaded again when an update time point of a next video data block is up. When the user does not operate the information flow page all the time, the step is circulated.

(6) The user clicks a play button of one livestreaming video, and the terminal plays a pre-downloaded video data block of two seconds corresponding to the livestreaming video.

Here, each livestreaming video in the information flow page corresponds to a corresponding livestreaming play button.

(7) While the video data block is played, a timespan in the video data block is parsed, when the video data block ends playing, follow-up video data are requested from the server by carrying the timespan, and the server will continue issuing follow-up video cache data from a playing end location of the video data block of 2 seconds.

(8) The terminal, after ending playing the video data block, continues to playing the follow-up video cache data.

In some embodiments, as the server has a video cache, at the moment, the livestreaming video played by the user has higher delay compared with the livestreaming video at the current livestreaming time point. For example, delay is 20 seconds. In order to solve the problem of the high delay, a terminal player may start a multiplied speed playing function, for example, a multiplied speed value is set to be 1.4 times, the user will end playing the cache video of 20 seconds in 14 seconds, and finally, after minimum delay is reached, the multiplied speed value of the player is set to be 1-times multiplied speed, and normal playing is restored.

Referring to FIG. 10, FIG. 10 is a schematic diagram showing switching livestreaming videos by switching livestreaming rooms up and down consistent with the disclosure.

Here, the user views the livestreaming videos in a mode of switching the livestreaming rooms up and down, and may also adopt the above method for playing the livestreaming video. When the user views the livestreaming videos in a current livestreaming room, the terminal will obtain a video playing address of a next livestreaming room, and load a corresponding video data block, so that the loaded video data block is played when switching to the next livestreaming room. At the same time, a timespan in the video data block is parsed. When the video data block ends playing, follow-up video data are requested from the server by carrying the timespan, and the server will continue issuing the follow-up video cache data from the playing end location of the video data block of 2 seconds; and the terminal, after ending playing the video data block, continues to play the follow-up video cache data.

Figure 11:
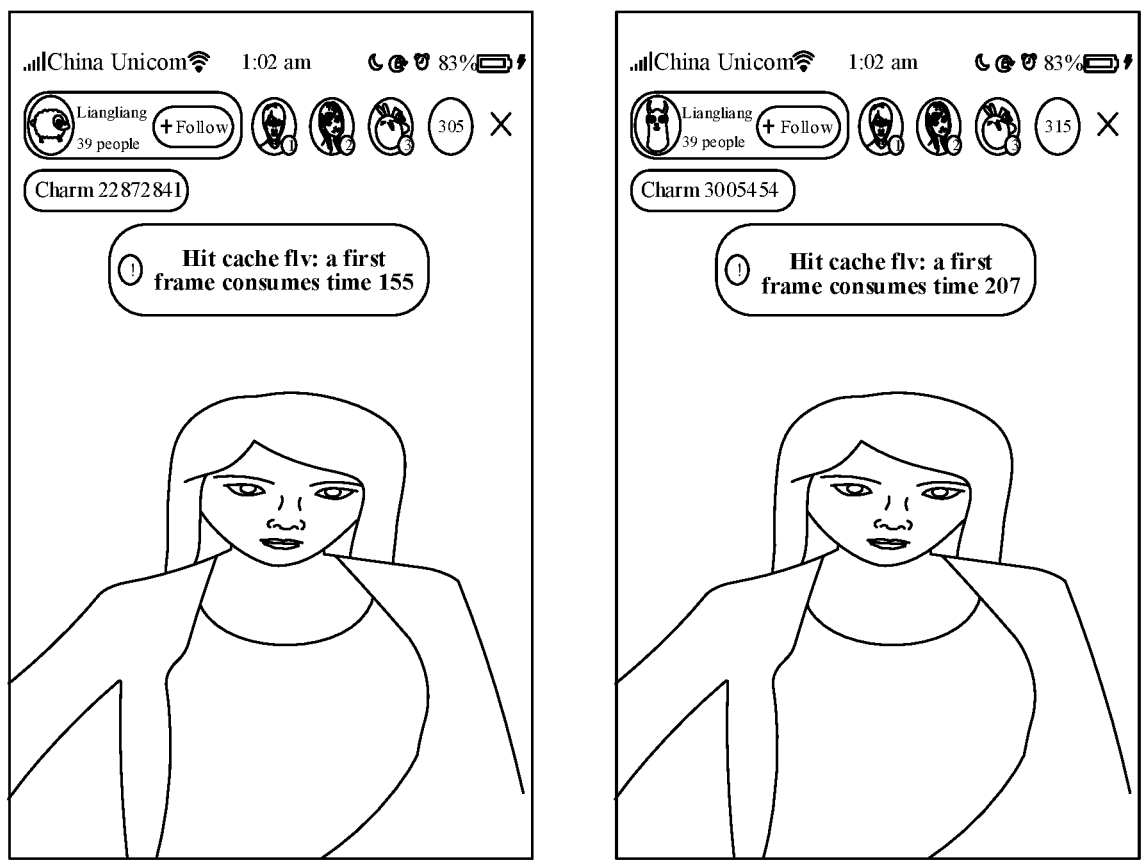
FIG. 11 is a schematic diagram showing time consumption of playing start of a livestreaming video consistent with the disclosure.

By applying the above embodiments of the disclosure, a playing start speed of the livestreaming video may be increased remarkably, and fast and stable playing experience may be met. Referring to FIG. 11, FIG. 11 is a schematic diagram showing time consumption of playing start of a livestreaming video consistent with the disclosure. Here, in a scene of entering the livestreaming room from the information flow page, time from audio and video room entering to a first-frame video rendering may be shortened to 207 ms, and time of first-frame video rendering from switching the livestreaming room up and down to a current livestreaming room is shortened to 155 ms. Moreover, in a process of switching livestreaming rooms to play, there is no livestreaming lagging and video frame skipping, and delay is low.

An exemplary structure of a software module as which an apparatus 555 for playing a livestreaming video consistent with the disclosure is implemented continues to be described below. In some embodiments, as shown in FIG. 2, the software module stored in the apparatus 555 for playing the livestreaming video of a memory 550 may include:

a loading module 5551, configured to display an information flow page including at least one livestreaming video; a video data block of each livestreaming video being updated periodically in the information flow page;

a first playing module 5552, configured to play a target video data block of a first livestreaming video in response to a playing instruction for the first livestreaming video in the information flow page;

a transmitting module 5553, configured to obtain target cache data corresponding to the first livestreaming video;

the target cache data belonging to historical livestreaming data of the first livestreaming video at a target duration before a current livestreaming time point, and the target duration being greater than or equal to an update period of the video data block; and a second playing module 5554, configured to play the target cache data after the target video data block ends playing.

In some embodiments, the loading module 5551 is further configured to execute the following processing respectively for each livestreaming video in the information flow page:

transmitting a first obtaining request for obtaining the video data block of the livestreaming video;

receiving a target Internet protocol address returned based on the first obtaining request, where a geographical location of a service node corresponding to the target Internet protocol address matches a geographical location of a terminal displaying the information flow page; and pulling and loading the video data block of the livestreaming video from the service node based on the target Internet protocol address.

In some embodiments, the loading module 5551 is further configured to obtain a video playing address of the information flow page, the video playing address corresponding to an Internet protocol address of a service management node; and invoke, based on the video playing address, a service management interface to transmit the first obtaining request to the service management node;

the first obtaining request being used for determining, by the service management node, the service node whose geographical location matches the geographical location where the terminal is located and returning the target Internet protocol address of the determined service node.

In some embodiments, the obtaining request carries a playing end time point corresponding to the target video data block, and the apparatus further includes:

a parsing module, configured to parse the target video data block to obtain the playing end time point corresponding to the target video data block.

The transmitting module 5553 is further configured to transmit an obtaining request for the target cache data of the first livestreaming video, and receive the returned target cache data, a playing start time point of the target cache data being after and adjacent to the playing end time point.

In some embodiments, the transmitting module 5553 is further configured to transmit the obtaining request for the target cache data corresponding to the first livestreaming video to the service management node.

The obtaining request is configured to query, by the service management node, a plurality of service nodes where historical livestreaming data are cached and selecting a target service node from the plurality of service nodes.

The transmitting module 5553 is further configured to receive the target cache data returned by the target service node.

In some embodiments, the second playing module 5554 is further configured to obtain a target playing speed corresponding to the target cache data; and adjust a current playing speed to the target playing speed after the target video data block ends playing, and play the target cache data based on the target playing speed, where the target playing speed is greater than the current playing speed.

In some embodiments, the second playing module 5554 is further configured to obtain a playing duration of the target cache data; and determine a playing duration interval to which the playing duration belongs, and use a playing speed corresponding to the playing duration interval as the target playing speed.

In some embodiments, the second playing module 5554 is further configured to transmit an obtaining request for livestreaming data of the first livestreaming video corresponding to the current livestreaming time point in a process of playing the target cache data at the target playing speed;

receive the returned livestreaming data at the current livestreaming time point, and adjust the target playing speed to a standard playing speed after the target cache data ends playing; and play the livestreaming data at the current livestreaming time point at the standard playing speed.

In some embodiments, the apparatus further includes:

a third playing module, configured to play a loaded video data block of a second livestreaming video in response to switching from the first livestreaming video to the second livestreaming video in a process of playing the first livestreaming video, and transmit an obtaining request for cache data corresponding to the second livestreaming video, where the cache data belong to historical livestreaming data of the second livestreaming video at a target duration before a current livestreaming time point; and receive the returned cache data, and play the cache data after the loaded video data block of the second livestreaming video ends playing.

In some embodiments, the apparatus further includes:

a presentation module, configured to present, in the information flow page, a playing function item corresponding to each livestreaming video.

The first playing module 5552 is further configured to receive the playing instruction for the first livestreaming video, the playing instruction being triggered based on the playing function item corresponding to the target playing video; and play the target video data block corresponding to the first livestreaming video in response to the playing instruction.

In some embodiments, the presentation module is further configured to present, in the information flow page, loading prompt information corresponding to each livestreaming video;

where the loading prompt information is used for prompting that the video data block of the corresponding livestreaming video is loaded successfully.

In some embodiments, the loading module 5551 is further configured to load a first video data block of each livestreaming video in the information flow page;

detect whether the playing instruction for each livestreaming video is received within the update period of the video data block;

load a second video data block of each livestreaming video when the playing instruction for each livestreaming video is not detected and when it is determined that an update time point of the video data block is up based on the update period and a loading time point of the first video data block, and release a cache space corresponding to the first video data block.

By applying the above embodiments of the disclosure, the loaded video data block of each livestreaming video in the information flow page is updated according to the update period. When the playing instruction for the first livestreaming video is received, the target video data block of the first livestreaming video is played first, meanwhile, the target cache data corresponding to the first livestreaming video are further obtained, and the target cache data are played after the target video data block ends playing. Here, the target cache data belong to the historical livestreaming data of the first livestreaming video at the target duration before the current livestreaming time point, after the video data block ends playing, the target cache data belonging to the historical livestreaming data may be played, moreover, as the target duration is greater than or equal to the update period of the video data block, the target cache data and the played video data block are connected, thus, the occurrence of the phenomena of video frame skipping and lagging caused by directly pulling latest livestreaming data at a current time point is reduced, and the smoothness of playing the livestreaming video is improved.

The disclosure further provides an electronic device, including:
a memory, configured to store executable instructions; and
a processor, configured to execute the executable instructions stored in the memory to implement the method for playing the livestreaming video consistent with the disclosure.

The disclosure further provides a computer program product or a computer program. The computer program product or the computer program includes computer instructions. The computer instructions are stored in a computer readable storage medium. A processor of a computer device reads the computer instructions from the computer readable storage medium. The processor executes the computer instructions, such that the computer device executes the method for playing the live streaming video consistent with the disclosure.

The disclosure further provides a computer readable storage medium, storing executable instructions. The executable instructions are executed by a processor to implement the method for playing the livestreaming video consistent with the disclosure.

In some embodiments, the computer readable storage medium may be an FRAM, ROM, PROM, EPROM, EEPROM, flash memory, a magnetic surface memory, an optical disk, a CD-ROM or other memories, or may be various devices including any one or any combination of the above memories.

In some embodiments, the executable instructions may be compiled in any form of programming language (including a compiled or an interpretive language, or a declarative or procedural language) by adopting a form of a program, software, a software module, a script or a code, and may be deployed in any form, including being deployed as an independent program or as a module, a component, a subroutine or other units suitable for being used in a computing environment.

As an example, the executable instructions may but not necessarily correspond to files in a file system, may be stored in a part of a file saving other programs or data, for example, stored in one or more scripts in a Hyper Text Markup Language (HTML) file, stored in a single file dedicated to a discussed program, or stored in a plurality of collaborative files (for example, a file storing one or more modules, a subprogram or a code part).

As an example, the executable instructions may be deployed to be executed on one computing device, or executed on a plurality of computing devices located in one place, or executed on a plurality of computing devices distributed in a plurality of places and interconnected through a communication network.

The above described are only some embodiments of the disclosure rather than intending to limit the scope of the disclosure. Any modification, equivalent replacement and improvement made within the spirit and scope of the disclosure fall within the scope of the disclosure.

What is claimed is:

1. A livestreaming video playing method executed by a computer device comprising:
displaying an information flow page including at least one livestreaming video, wherein a video data block of each of the at least one livestreaming video in the information flow page is stored on the computer device and updated periodically at an update period;
playing a target video data block of a first livestreaming video of the at least one livestreaming video in response to a playing instruction for the first livestreaming video;
obtaining, from a service management node, target cache data of the first livestreaming video cached on the service management node, the target cache data belonging to historical livestreaming data of the first livestreaming video at a target duration before a current livestreaming time point, and the target duration of the historical livestreaming data cached on the service management node being greater than or equal to the update period at the computer device, wherein a duration of the video data block stored on the computer device is less than the target duration, a playing end time point of the target video data block belongs to a timespan of the historical livestreaming data cached on the service management node, and a playing start time point of the target cache data is after and adjacent to the playing end time point of the target video data block; and
playing the target cache data after the target video data block ends playing.

2. The method according to claim 1, further comprising, for each of the at least one livestreaming video in the information flow page:
transmitting an obtaining request for obtaining the video data block of the livestreaming video;
receiving a target Internet protocol address returned based on the obtaining request, a geographical location of a service node corresponding to the target Internet protocol address matching a geographical location of a terminal displaying the information flow page; and
pulling and loading the video data block of the livestreaming video from the service node based on the target Internet protocol address.

3. The method according to claim 2, wherein transmitting the obtaining request for obtaining the video data block of the livestreaming video includes:
obtaining a video playing address of the information flow page, the video playing address corresponding to an Internet protocol address of the service management node; and
invoking, based on the video playing address, a service management interface to transmit the obtaining request to the service management node, the obtaining request being configured for the service management node to determine the service node with geographical location matching the geographical location of the terminal and return the target Internet protocol address of the service node.

4. The method according to claim 1, further comprising:
parsing the target video data block to obtain the playing end time point corresponding to the target video data block;
wherein obtaining the target cache data of the first livestreaming video includes:
transmitting an obtaining request for the target cache data of the first livestreaming video; and
receiving the target cache data.

5. The method according to claim 4, wherein:
transmitting the obtaining request for the target cache data of the first livestreaming video includes transmitting the obtaining request for the target cache data to the service management node, the obtaining request being configured for the service management node to query a plurality of service nodes that cache the historical livestreaming data and select a target service node from the plurality of service nodes; and
receiving the target cache data includes receiving the target cache data returned by the target service node.

6. The method according to claim 1, wherein playing the target cache data after the target video data block ends playing includes:
obtaining a target playing speed corresponding to the target cache data, the target playing speed being greater than a current playing speed; and
adjusting the current playing speed to the target playing speed after the target video data block ends playing, and playing the target cache data based on the target playing speed.

7. The method according to claim 6, wherein obtaining the target playing speed corresponding to the target cache data includes:
obtaining a playing duration of the target cache data; and
determining a playing duration interval to which the playing duration belongs, and using a playing speed corresponding to the playing duration interval as the target playing speed,
wherein different playing duration intervals correspond to different playing speeds.

8. The method according to claim 6, further comprising:
transmitting an obtaining request for livestreaming data of the first livestreaming video corresponding to the current livestreaming time point in a process of playing the target cache data at the target playing speed;
receiving the livestreaming data at the current livestreaming time point, and adjusting the target playing speed to a standard playing speed after the target cache data ends playing; and
playing the livestreaming data at the current livestreaming time point at the standard playing speed.

9. The method according to claim 1, further comprising:
in a process of playing the first livestreaming video, in response to switching from the first livestreaming video to a second livestreaming video:
playing a loaded video data block of the second livestreaming video; and
transmitting an obtaining request for cache data corresponding to the second livestreaming video, the cache data belong to historical livestreaming data of the second livestreaming video at a target duration before the current livestreaming time point;
receiving the cache data; and
playing the cache data after the loaded video data block of the second livestreaming video ends playing.

10. The method according to claim 1, further comprising, after displaying the information flow page:
presenting, in the information flow page, a playing function item of each of the at least one livestreaming video;
wherein playing the target video data block of the first livestreaming video includes:
receiving the playing instruction for the first livestreaming video, the playing instruction being triggered based on a playing function item of the target playing video; and
playing the target video data block of the first livestreaming video in response to the playing instruction.

11. The method according to claim 1, further comprising, after displaying the information flow page:
presenting, in the information flow page, loading prompt information corresponding to each of the at least one livestreaming video, the loading prompt information being configured to prompt that the video data block of the corresponding livestreaming video is loaded successfully.

12. The method according to claim 1, further comprising, for each of the at least one livestreaming video:
loading a first video data block of the livestreaming video in the information flow page;
detecting whether a playing instruction for the livestreaming video is received within the update period;
loading a second video data block of the livestreaming video in response to the playing instruction for the livestreaming video not being detected and the livestreaming video being up to update video data block; and
releasing a cache space corresponding to the first video data block.

13. An electronic device comprising:
a memory storing executable instructions; and
a processor configured to execute the executable instructions stored in the memory to:
display an information flow page including at least one livestreaming video, wherein a video data block of each of the at least one livestreaming video in the information flow page is stored on the electronic device and updated periodically at an update period;
play a target video data block of a first livestreaming video of the at least one livestreaming video in response to a playing instruction for the first livestreaming video;
obtain, from a service management node, target cache data of the first livestreaming video cached on the service management node, the target cache data belonging to historical livestreaming data of the first livestreaming video at a target duration before a current livestreaming time point, and the target duration of the historical livestreaming data cached on the service management node being greater than or equal to the update period at the electronic device, wherein a duration of the video data block stored on the electronic device is less than the target duration, a playing end time point of the target video data block belongs to a timespan of the historical livestreaming data cached on the service management node, and a playing start time point of the target cache data is after and adjacent to the playing end time point of the target video data block; and
play the target cache data after the target video data block ends playing.

14. The device according to claim 13, wherein the processor is further configured to execute the executable instructions to, for each of the at least one livestreaming video in the information flow page:
transmit an obtaining request for obtaining the video data block of the livestreaming video;
receive a target Internet protocol address returned based on the obtaining request, a geographical location of a service node corresponding to the target Internet protocol address matching a geographical location of a terminal displaying the information flow page; and
pull and load the video data block of the livestreaming video from the service node based on the target Internet protocol address.

15. The device according to claim 14, wherein the processor is further configured to execute the executable instructions to transmit the obtaining request for obtaining the video data block of the livestreaming video by:

obtaining a video playing address of the information flow page, the video playing address corresponding to an Internet protocol address of the service management node; and invoking, based on the video playing address, a service management interface to transmit the obtaining request to the service management node, the obtaining request being configured for the service management node to determine the service node with geographical location matching the geographical location of the terminal and return the target Internet protocol address of the service node.

16. The device according to claim 13, wherein:

the processor is further configured to execute the executable instructions to parse the target video data block to obtain the playing end time point corresponding to the target video data block; and the processor is further configured to execute the executable instructions to obtain the target cache data of the first livestreaming video by:

transmitting an obtaining request for the target cache data of the first livestreaming video; and receiving the target cache data.

17. The device according to claim 16, wherein the processor is further configured to execute the executable instructions to:

transmit the obtaining request for the target cache data of the first livestreaming video by transmitting the obtaining request for the target cache data to the service management node, the obtaining request being configured for the service management node to query a plurality of service nodes that cache the historical livestreaming data and select a target service node from the plurality of service nodes; and receive the target cache data by receiving the target cache data returned by the target service node.

18. The device according to claim 13, wherein the processor is further configured to execute the executable instructions to play the target cache data after the target video data block ends playing by:

obtaining a target playing speed corresponding to the target cache data, the target playing speed being greater than a current playing speed; and adjusting the current playing speed to the target playing speed after the target video data block ends playing, and playing the target cache data based on the target playing speed.

19. The device according to claim 18, wherein the processor is further configured to execute the executable instructions to obtain the target playing speed corresponding to the target cache data by:

obtaining a playing duration of the target cache data; and determining a playing duration interval to which the playing duration belongs, and using a playing speed corresponding to the playing duration interval as the target playing speed, wherein different playing duration intervals correspond to different playing speeds.

20. A non-transitory computer readable storage medium storing executable instructions that, when executed by a processor of a computer device, cause the processor to:

display an information flow page including at least one livestreaming video, wherein a video data block of each of the at least one livestreaming video being updated periodically in the information flow page is stored on the computer device and updated periodically at an update period;

play a target video data block of a first livestreaming video of the at least one livestreaming video in response to a playing instruction for the first livestreaming video;

obtain, from a service management node, target cache data of the first livestreaming video cached on the service management node, the target cache data belonging to historical livestreaming data of the first livestreaming video at a target duration before a current livestreaming time point, and the target duration of the historical livestreaming data cached on the service management node being greater than or equal to the update period at the computer device, wherein a duration of the video data block stored on the computer device is less than the target duration, a playing end time point of the target video data block belongs to a timespan of the historical livestreaming data cached on the service management node, and a playing start time point of the target cache data is after and adjacent to the playing end time point of the target video data block; and play the target cache data after the target video data block ends playing.

* * * * *